Dec. 7, 1954  R. H. LARSON  2,696,140
FILM GATE
Filed June 1, 1953  2 Sheets-Sheet 1
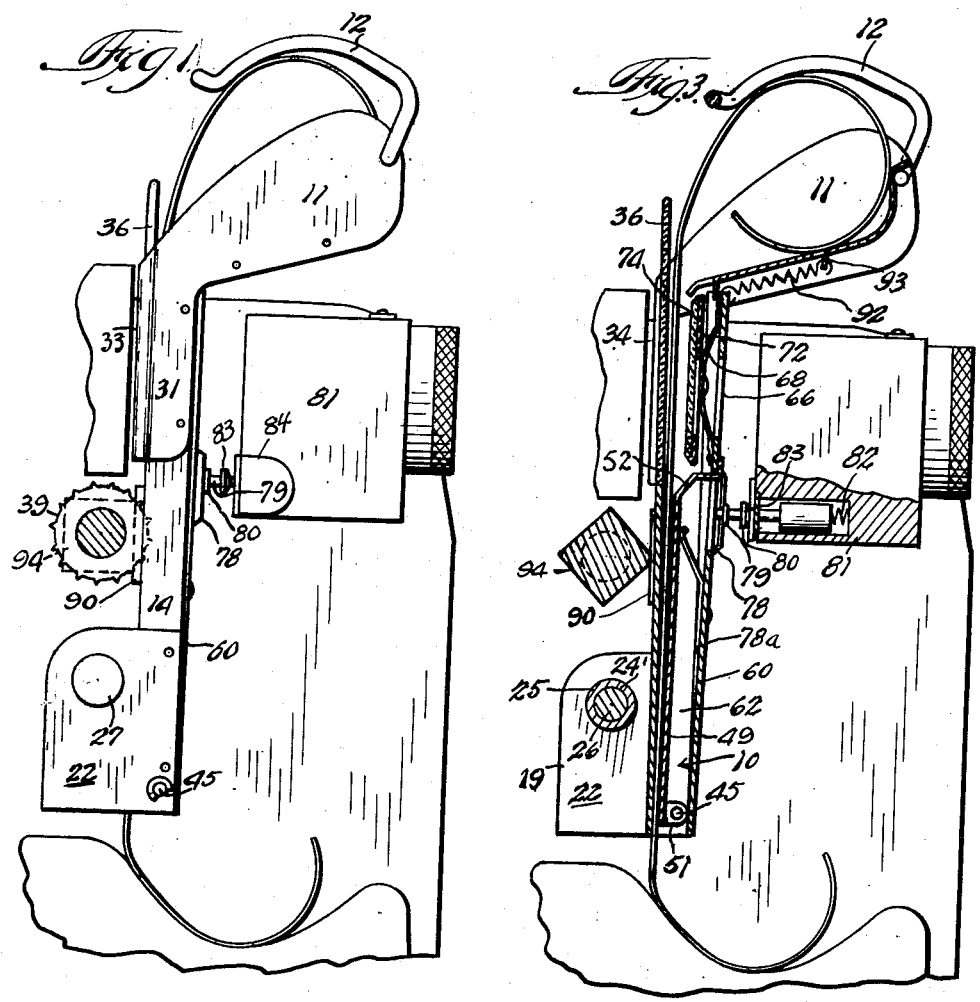
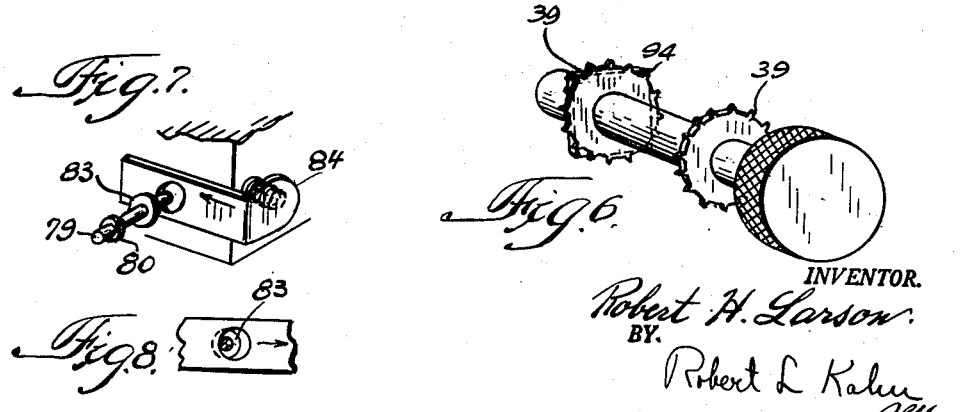
INVENTOR.
Robert H. Larson
BY
Robert L. Kahn Dec. 7, 1954  R. H. LARSON  2,696,140
FILM GATE
Filed June 1, 1953  2 Sheets-Sheet 2
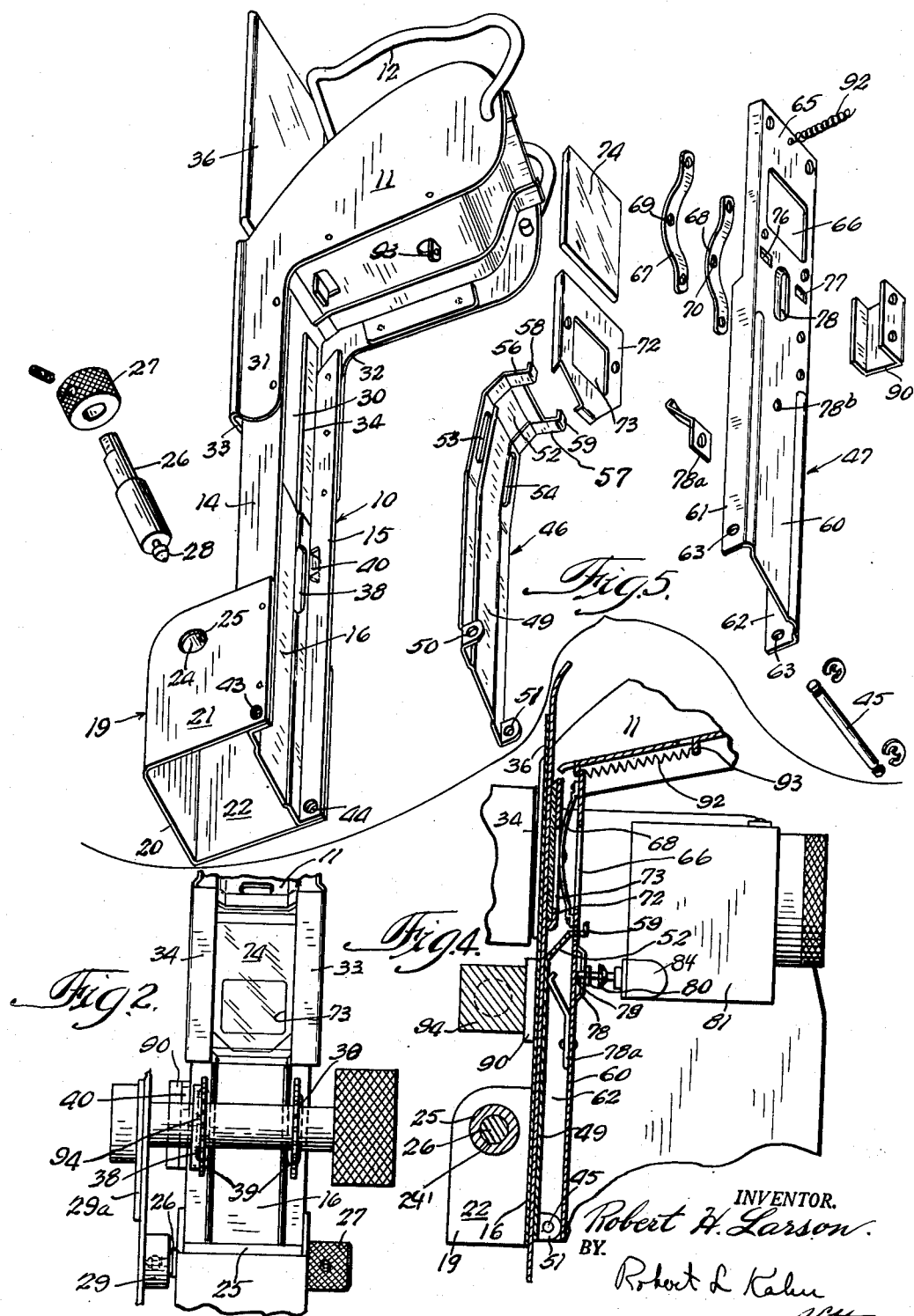
INVENTOR.
Robert H. Larson
BY Robert L. Kahn

United States Patent Office

2,696,140
Patented Dec. 7, 1954

2,696,140

FILM GATE

Robert H. Larson, Batavia, Ill., assignor to Du Kane Corporation, St. Charles, Ill., a corporation of Illinois Application June 1, 1953, Serial No. 358,833

4 Claims. (Cl. 88—17)

This invention relates to a film gate for strip film projectors.

Film gates for strip film projectors are frequently difficult to handle and difficult for an operator to thread the film through when starting. Many film gates are so constructed that when the film is threaded through, the surface of the film is frequently scratched. Additionally, many film gates are not easily removable from the projector and require that the film be threaded through the gate without removal of the gate from the projector.

Other objections to film gates in general are that they are generally complicated and relatively expensive to make.

This invention makes it possible to have a film gate which may be easily and simply removed from a projector and which may be threaded either with the film gate in the projector or removed from the projector with a minimum of trouble and effort. Furthermore, the film gate embodying the present invention is so constructed that threading the film through can only be accomplished in the correct manner.

Film gates of the prior art have also been characterized by the objection that the film is gripped tightly at all times. In such film gates, the advance of the film frame at the gate requires greater effort and at the same time increases the danger of scratching of the film surface. The film gate embodying the present invention is free of the above objections and has means cooperating with the projector whereby, when the projector operates to advance the film one frame, the gate is loosened to permit the film to feed freely. When the film is properly in position, the film is gripped with the film frame properly registering with the film gate window for projection purposes. In the event that the film is to be withdrawn, rather than fed through, it may always be pulled back without damage to the film sprocket holes.

While the invention may assume a variety of forms, a simple exemplary embodiment of the invention is illustrated in the drawings, it being understood that substantial changes may be made in the construction without departing from the scope of the invention.

Referring therefore to the drawing:

Figure 1 is a side elevation, partly in section, of a film gate embodying the present invention disposed in a projector;

Figure 2 is a rear view of the film gate embodying the present invention, the sprocket drive and attaching means carried by the projector being also shown;

Figure 3 is a view similar to Figure 1 but showing certain parts in section when the film is being advanced;

Figure 4 is a view similar to Figure 3 but with the parts in a rest position;

Figure 5 is an exploded view of the parts making up the complete film gate;

Figure 6 is a perspective detail of the film drive;

Figures 7 and 8 are details of a catch for the gate.

The film gate has body 10 and well 11 attached to the top of the body. Into the well a roll of strip film may be disposed. Well 11 has film holder 12 pivotally mounted at the well sides. Body 10 has sides 14 and 15 and runner 16. At the bottom of body 10, hood 19 is provided. This consists of one piece of metal bent to form front wall 20 and side walls 21 and 22. The side walls are welded to sides 14 and 15 of body 10.

Side walls 21 and 22 of hood 19 are provided with aligned apertures 24 and 24'. Sleeve 25 extends between side walls 21 and 22 at apertures 24 and 24' to form a channel transversely through hood 19. Operating in the channel formed by sleeve 25 is pin 26 having knob 27 attached thereto at one end. Pin 26 has headed end 28 for cooperation with fixed spring socket 29 carried by plate 29a of a projector. By engaging headed end 28 of pin 26 with socket 29 the entire film gate may be attached to or removed from a projector. The film gate as a whole can move a little around pin 26. The pin is shouldered to cooperate with sleeve 25 so that the pin may be moved to and fro a limited distance for clamping and unclamping without entirely removing the pin from the sleeve. Thus the pin will always remain with the film gate and eliminate danger of loss.

Body 10 has runner 16 cut away near well 11 to leave only sides 14 and 15 and provide window 30 (Figure 5). Extensions 31 and 32 of well 11 overlie sides 14 and 15 of body 10 and extend rearwardly of body 10 and have webs 33 and 34 spaced from but parallel to the plane of runner 16. Slidably disposed between webs 33 and 34 is transparent glass plate 36. The webs and runner 16 are shaped so that glass 36 will be maintained in position but may readily be removed by sliding upwardly toward well 11. The various directions in connection with the description assume the film gate mounted in a projector. The well is on top and runner 16 is at the rear.

Runner 16 is provided with elongated slots 38 longitudinally of the runner near sides 14 and 15. Slots 38 are provided to accommodate sprockets 39 on the projector, these sprockets entering slots 38 and engaging holes in the film. Body 10 is also provided with ear 40 punched out of side 15 near runner 16. Sprocket slots 38 and ear 40 are both below window 16.

Near the bottom of body 10, sides 14 and 15 are provided with aligned apertures 43 and 44 through which pivot pin 45 passes. Pin 45 is locked in position against removal by any desired means, as for example, by C washers sprung over slots at the pin ends. Carried on pivot pin 45 are pressure plate 46 and pressure plate holder 47. Both plate 46 and holder 47 lie generally within sides 14 and 15 of body 10.

Pressure plate 46 consists of body 49 having pivot shaft ears 50 and 51 at one end thereof and curved portion 52 at the other end thereof. Body 49 is provided with slots 53 and 54 which register with sprocket slots 38 in guide body 10. Curved portion 52 of the pressure plate extends forwardly from the general plane of body 49 in the same direction as ears 50 and 51. Curved portion 52 terminates in bent fingers 56 and 57 whose extreme ends 58 and 59 are sharply bent away from body 10. It is understood that pressure plate 46 has a width somewhat smaller than the width of body 10 with ears 50 and 51 registering with apertures 43 and 44. The length of pressure plate 46 is such that fingers 56 and 57 are near the bottom of window 30 of body 10.

Pressure plate holder 47 has the general shape of a channel having body 60 and side flanges 61 and 62. Flanges 61 and 62 are apertured at 63 to accommodate pivot pin 45.

Pressure plate holder 47 is substantially as long as body 10 and has top end 65 lying just below well 11 in the assembled film gate. Holder 47 has film gate window 66 near the upper end of the holder, window 66 being positioned, so that from the rear, the window appears well inside of window 30 of body 10. Holder 47 has arched flexible springs 67 and 68 riveted thereto just above and below window 66, the springs extending longitudinally of body 60 and flanking the sides of frame window 66 and being riveted at their lower ends. Arched springs 67 and 68 have riveted at their centers 69 and 70 window glass holder 72. Glass holder 72 has window 73 and has three sides flanged to slidingly accommodate beveled glass 74. Windows 66 and 73 register and are large enough to frame one film frame.

Below window 66, body 60 of the holder is apertured at 76 and 77 for accommodating fingers 56 and 57 of pressure plate 46. Elongated aperture 78 extends lengthwise of body 60 down from between apertures 76 and 77 and is so formed that the metal is bulged forwardly of body 60 opposite to the direction of flanges 61 and 62. Below aperture 78, pressure plate holder 47 carries leaf spring 78a riveted to holder 47 at 78b. Leaf spring 78a extends upwardly and away from holder body 60.

Pin 79 having collar 80 is mounted in lens holder 81. Spring 82 urges pin 79 against the film gate, pin 79 entering aperture 78 and being stopped by collar 80 bearing against the metal of the holder body. Collar 83 on the pin cooperates with apertured finger piece 84 to provide a two position lock for pin 79. Apertured piece 84 is spring pressed outwardly. The rear or inside part of collar 83 is beveled so that pin 79 may be pressed in to lock. Finger piece 84 may be pressed in to release pin 79. The aperture in piece 84 is large enough to clear collar 83 when piece 84 is pressed in.

Catch 90 consisting of a U-shaped piece of metal is rigidly attached, as by rivets, to holder body 60 near flange 62. Catch 90 is so disposed along body 60 that, when the entire gate is assembled, ear 40 of body 10 will lie under the overhanging edge of the catch. Catch 90 functions as a cam follower in a manner to be explained later.

It will be noted that holder 47 has its flanges extending toward body 10 when assembled therewith and that the spring mounted film gate frame 72 is on the inside of the holder; i. e., between holder 47 and body 10 in the assembled device. Catch 90 extends from the outside of body 60 around the side of the entire film gate assembly and rearwardly to form a stop for ear 40 to limit movement of holder 47 on pivot pin 45 away from body 10. Coil spring 92 extends between top end 65 of the holder and ear 93 on the bottom of well 11. This spring normally urges the holder and pressure plate rearwardly. The forward rocking of the holder is limited by ear 93 extending from the bottom of well 11. Square cam shaft 94 on the sprocket shaft cooperates with catch 90 to move holder 47 forwardly away from the film when a frame advance occurs.

The various parts are formed of suitable material as sheet steel or other metal or material as glass, spring steel and the like.

The film guide is assembled in the following manner: Holder 47 has permanently attached thereto spring mounted gate window frame 72 and catch 90. Glass 74 is disposed in the frame. Next pressure plate 46 is disposed with ears 50 and 51 facing apertured parts of flanges 61 and 62. Pressure plate 46 is aligned with holder 47 so that body 49 is between flanges 61 and 62. Then pressure plate 46 is turned away from holder 47 while keeping fingers 56 and 57 near apertures 76 and 77 of the holder. By sufficient movement, bent ends 58 and 59 of the pressure plate may be inserted into apertures 76 and 77. Then the pressure plate and holder are brought together, with the pressure plate disposed between the flanges of the holder. The two are slid along body 10 between sides 14 and 15 upwardly to bring the various pivot pin apertures into line. When this occurs, the pin is slid into position, the washers positioned and the assembly is complete.

When holder 47 is pressed toward body 10, pressure plate 46 is moved toward runner 16 of body 10. Additional movement of holder 47 toward runner 16 permits pressure plate 46 to be sprung with fingers 56 and 57 projecting outwardly through apertures 76 and 77. Upon movement of holder 47 away from body 10, the pressure plate returns to normal position. Bent ends 58 and 59 of pressure plate 46 are engaged by the metal of body 60 of holder 47 to limit the movement of the pressure plate when the holder is pulled away from body 10.

The film gate is disposed in a projector with pin 79 retracted. Fixing pin 26 in position on the projector plate, pin 79 is released. The film gate is now positioned.

When the film gate is being used, the sprocket knob is operated to frame the film. As is well known, conventional sprocket drives for strip film projectors have a clutch which permits framing of the sprockets, independently of the frame advance mechanism. In the normal position, a flat side of square cam 94 engages catch 90. Spring pressed pin 79 presses holder 47 rearwardly against body 10. Film will be tightly gripped. However, the film can still be moved up and down by the sprocket for framing. When film is to be advanced a complete frame, the sprocket shaft, including cam 94 will be turned 90 degrees. The mechanism is so designed that a quarter turn of the sprocket shaft will advance the film one frame. When cam 94 turns, a cam edge presses catch 90 and forces holder 47 to rock forwardly of the gate against the urge of pin 79. This loosens the grip of the gate on the film while the film is moving and prevents scratching of the film upon the glass surfaces at the gate window.

Leaf spring 78a urges film guide pressure plate 46 against the film to maintain film engagement with the sprockets. When the gate is pulled forward for loading, pin 79 is locked in an inner position. The entire gate is loose on its pivot pin 26 and body 10 is clear of pressure plate 46 and holder 47. Thus a clear passage for inserting or removing film is provided. When film has been introduced, the entire gate is rocked back when pin 79 is released.

If new film is not properly engaged by teeth of the sprocket, pressure plate 46 is rocked forwardly. When film is advanced and teeth engage, plate 46 snaps against film to hold same.

What is claimed is:

1. A removable film gate for a strip film projector, said gate comprising an elongated channel-shaped gate body having a film supply end and a film receiving end, said gate body having, with respect to the direction of travel of light from the projector lamp to a screen, front and rear faces, said gate body having side flanges extending rearwardly, an elongated channel-shaped pressure plate holder disposed between the side flanges of the body, said plate holder having side flanges extending forwardly, means for pivotally mounting said plate holder at the film receiving end of said body, said plate holder extending up to the film supply end of the gate body, spring means for biasing the free end of said plate holder away from said gate body, means to limit the movement of said plate holder in response to its spring bias, said gate body having its body cut away near the film supply end to provide a film frame window, said plate holder having an opening registering with the gate body opening, a glass plate, spring means for mounting said glass plate at the film gate, said glass plate being disposed between the gate body side flanges and being normally spaced forwardly of the plate holder body but movable against its spring mounting toward the gate holder body, an elongated film guide pressure plate disposed between the side flanges of the plate holder and extending from the film receiving end of the gate body up to the nearest end of the glass plate, means for pivotally securing one end of said pressure plate to the gate body near the film receiving end thereof, spring means for biasing the free end of the pressure plate away from the plate holder, means to limit the movement of said free end of said pressure plate away from the plate holder body, said gate body and pressure plate having registering slots along the body sides thereof to accommodate sprockets to engage the usual apertures along the film sides, said sprocket slots being disposed between the pivot of the pressure plate and the frame window, said pressure plate being urged against the holder plate by projector mechanism during the advance of a film frame, the strip film travelling between the pressure plate and gate body.

2. The structure according to claim 1 wherein said plate holder and pressure plate are provided with a common pivot.

3. The structure according to claim 1 wherein the means for biasing the pressure plate consists of a leaf spring carried by the body of the plate holder.

4. The structure according to claim 1 wherein the means for limiting the movement of said plate holder comprises a U-shaped piece extending laterally from the body of the plate holder and an ear extending laterally from a side flange of the gate body.

No references cited.